Oct. 22, 1963     A. FLAVELL, JR     3,108,186
METHOD OF DETERMINING THE WALL THICKNESSES OF HOLLOW BODIES
Filed April 15, 1960
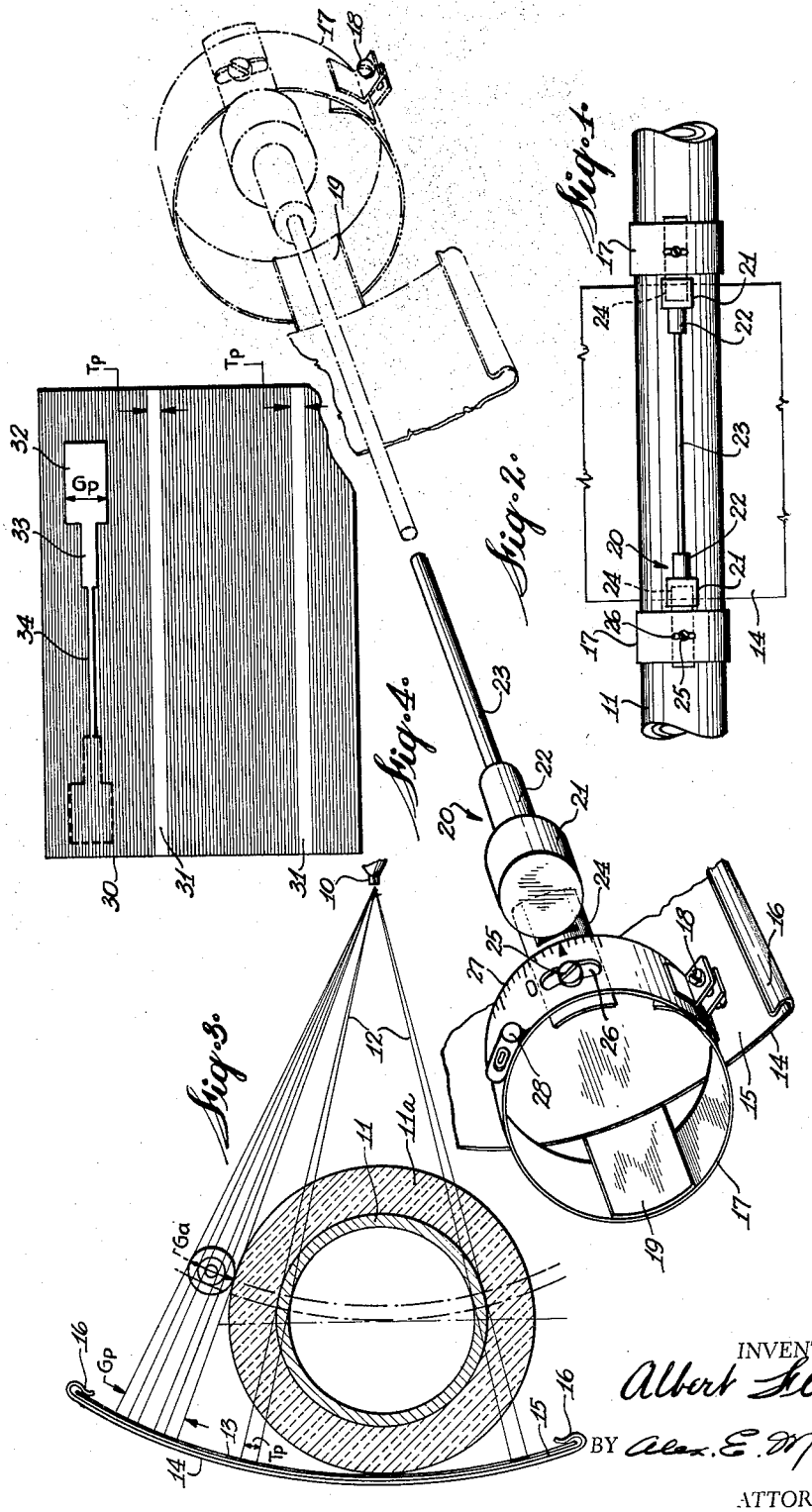
INVENTOR
Albert Flavell Jr.
BY Alex. E. MacRae
ATTORNEY United States Patent Office 3,108,186
Patented Oct. 22, 1963

3,108,186
METHOD OF DETERMINING THE WALL THICKNESSES OF HOLLOW BODIES
Albert Flavell, Jr., 297 S. Brock St., Sarnia, Ontario, Canada
Filed Apr. 15, 1960, Ser. No. 22,538
9 Claims. (Cl. 250—65)

This invention relates to a method of determining the wall thickness of hollow bodies such as piping, fittings and other tubular members, to determine the extent of pitting, erosion, and corrosion thereof.

In many commercial plants, piping and fittings are employed for the supply or transfer of flowable materials which may result in the pitting, erosion or corrosion of the piping and fittings. In such a plant, it is substantially essential that the piping and fittings be periodically inspected to determine the extent of pitting, erosion or corrosion in order that the plant may continue to perform its functions without interruption and in a satisfactory, safe, and efficient manner. Various inspection procedures for this purpose have heretofore been proposed.

It is an object of this invention to provide a method of inspecting and determine the wall thickness of piping and fittings which may be performed in a simple and rapid manner, which produces results of a more positively accurate nature, which is subject to the convenient maintenance of records thereof, and the results of which are of a self-reading nature.

Another object is to provide a method of inspecting piping and the like which results in an immediate visual indication of the condition of the piping and the like whereby the necessity of additional measurements and calculations may be frequently eliminated with consequent saving of time and expense.

The invention will be described with reference to the accompanying drawing, in which FIGURE 1 is a plan view of equipment employed in carrying out the invention, FIGURE 2 is a perspective view of the equipment, FIGURE 3 is a diagrammatic end elevation of the equipment, and FIGURE 4 is a plan view of a film negative produced in accordance with the invention.

The invention will be described with reference to a portion of piping but it will be understood that it may be employed with reference to any hollow body, tubular member or fitting, the wall thickness of which is to be determined.

In accordance with the invention, a source 10 of penetrative radiation is employed and, in use, is mounted in appropriate proximity to the pipe or piping 11 to be inspected whereby the rays 12 will be directed upon the piping. The source 10 is of conventional nature for the production of gamma rays, X-rays, or the like. The pipe is shown as having insulation 11a thereon but it will be understood that the present equipment is equally applicable to uninsulated as well as insulated bodies.

A photographic plate or film 13 is applied to the piping on the side thereof diametrically opposite the source 10 whereby the rays therefrom will extend through the pipe onto the film. The plate 13 is of arcuate shape and is curved about a radius approximately equal to the distance of the plate from the source 10, the concave surface of the plate being applied to the pipe whereby rays from the source 10 will be directed onto the plate in a substantially true and perpendicular radial direction. The plate is supported in the position described by suitable means such as a rigid sheet or plate 14 having an arcuate concave surface 15 for reception of the photographic plate 13 and being curved about approximately the same radius as the radius of curvature of the photographic plate. The plate 13 has a width which is preferably somewhat greater than the outside diameter of the pipe 11.

The longitudinal edges of the plate 14 may be provided with film-retaining lugs, clips or the like 16.

Means for mounting the film-supporting plate 14 on the pipe 11 comprises a pair of clamping collars 17 which are adapted to be clamped to the pipe, as by means of clamping screws 18, in spaced relation to each other. Each collar carries a projecting arm 19 which is generally parallel to the axis of the collar (and pipe) and which is preferaby of arcuate cross-section. The arms 19 support the end portions of plate 14 which are fixed to the arms.

A gauge or template 20 is also carried by the collar 17. As shown, such gauge or template is of cylindrical form and comprises a large diameter portion 21 at each end thereof, a smaller diameter portion 22 adjoining each portion 21, and a connecting section 23 of still smaller diameter. Each gauge portion 21 is fixed to projecting arm 24 mounted on a collar 17. Preferably, the arms 24 (and template) are adjustable about the circumference of collars 17 as by means of pin 25 and slot 26 connecting with the collars. A scale 27 and spirit level 28 on each collar may be provided to facilitate such adjustment.

The diameter of gauge or template sections 21 is of any suitable known figure. The diameter of sections 22 is preferably equivalent to the original wall thickness of the hollow body under inspection and the diameter of section 23 equivalent to the minimum limit wall thickness of such hollow body.

It will be apparent that, in use, the gauge or template 20 is also positioned between the source 10 and the plate 13 and in parallel axial relation to the pipe in order to produce a comparison image. Preferably, the gauge is positioned in one of two positions. In the position indicated in FIGURE 1, the gauge is located a distance of one outside pipe diameter from the plate 13. Conveniently, this position may be determined by placing the gauge on the pipe diametrically opposite the point of engagement of plate 13 with the pipe and in line with the source 10.

In the position indicated in FIGURE 3, the gauge is located a distance of less than one pipe diameter from the photographic plate and on an arc passing through the axis of the pipe and having the source of radiation as its center.

In operation, and referring to FIGURES 3 and 4, it will be observed that, with the equipment positioned as shown for inspection of the pipe 11, projections of both the pipe wall thickness, and the gauge thickness will be produced on the photographic plate 13 and the negative 30 shown in FIGURE 4. The actual pipe wall thickness can now be calculated using the following simple formula:

$$Ta = Tp \times \frac{Ga}{Gp}$$

where $Ta$=actual wall thickness
$Tp$=projected wall thickness
$Ga$=actual gauge thickness
$Gp$=projected gauge thickness When the gauge is located in the position illustrated in FIGURE 1, the formula to be employed is as follows, the character indications being the same:

$$Ta = Tp \times \frac{Ga + Gp}{2Gp}$$

Because of the use of a gauge or template of the type shown, a rapid visual inspection can be made in cases where actual measurements are not required. Thus, the pipe thicknesses can be quickly compared with the projected and actual gauge thicknesses without knowledge of formulae and other arbitrary factors.

Referring to FIGURE 4, it will be observed that the projected body wall thicknesses are indicated at 31, the chosen gauge diameter at 32, the gauge sections 22 representing the original wall thickness of the hollow body at 33, and the gauge section 23 representing the limit wall thickness of the body at 34.

Because the photographic plate 13 is curved about a radius having the source as its center, the rays at equal distances each side of the center line are cast upon the plate at an equal angle. Thus, no correction is required to compensate for varying angle projection. As a result, accurate projections on the plate are obtained.

Furthermore, the method described permits the use of the simple formulae set forth. Thus, knowledge of the actual outside diameter of the hollow body and other dimensions related to the radiation source are not necessary in order to effect the desired calculations.

The method described permits the determination of one wall thickness of a cylindrical or like body by radiography without having to radiograph both walls conjointly, the latter having to be done if the wall thickness determination is based on outside diameters as a reference. Thus, the method is suitable for thickness determination of castings such as valve bodies, pump casings and the like of irregular or variable configuration and dimensions.

The method described provides a self-reading result and a permanent record of the complete operation. Thus, no separate sheets of paper are required to record the thickness found. Such separate sheets are subject to easy loss and a radiograph without a template image thereon is meaningless for determination of measurements. Moreover, such a radiograph without a template does not indicate the actual body size under consideration. By providing means for visual comparison, geometric and like calculations with possibility of error therein are avoided.

It will be understood that the term "gauge" as employed in the appended claims includes any suitable template or gauge.

The axis of symmetry of plate 13 is a line through point 10, FIG. 3, normal to the plane of the figure.

I claim:

1. That method of determining the wall thickness of a hollow body, comprising, fixing with and at one side of said body, the sensitized concave side of a photographic plate formed as a portion of a cylindrical surface of known radius, fixing contiguous to said body a cylindrical gauge having a known diameter, exposing said plate by gamma rays emanating from a point on the axis of said cylindrical surface to include thereon side-by-side images of projections thereon of said body thickness and gauge, and measuring on the developed plate the projections of the diameter of said gauge and of said body thickness, whereby the actual body thickness may be determined as a combined function of said measurements.

2. That method of determining the actual wall thickness of a tubular body having a longitudinal axis, comprising, fixing with and externally of said body, the sensitized concave side of a photographic plate formed as the surface of a cylinder of known radius, and with the axis of said surface parallel with said longitudinal axis, fixing a cylindrical gauge with said body in position for projection of its image upon said plate, exposing said plate by gamma rays from a point on the axis of said cylindrical surface, and measuring upon the developed plate the dimensions of the projections of said wall thickness and said gauge, whereby the actual wall thickness may be determined as a combined function of said dimensions.

3. That method of determining the actual wall thickness of a tubular cylindrical body having an axis of symmetry, comprising, fixing with and in external tangential contact with said body, the sensitized concave surface of a photographic plate formed as the surface of a cylinder of larger radius than the radius of said body, fixing in predetermined circumferential position with respect to said body, a cylindrical gauge of known radius and with its axis parallel with said axis of symmetry, exposing said photographic plate by gamma rays emanating from a point on the axis of said plate, to form projected images of the wall thickness and said gauge, in side-by-side relation, and measuring upon the developed plate the projected dimensions of said wall thickness and gauge diameter, whereby the actual wall thickness may be determined as a combined function of said measured dimensions.

4. The method of claim 3, said gauge being positioned contiguous said body and with its axis intersecting an arc having said point as a center and a radius equal to the normal from said point to said axis of symmetry.

5. The method of claim 3, said gauge being positioned in tangential line contact with said body and with its axis intersecting the normal from said point to said axis of symmetry.

6. The method of inspection of a cylindrical pipe having a longitudinal central first axis, comprising, fixing externally of said pipe and in known radial spacing from said central axis, the concave sensitized surface of a photographic plate in the form of a portion of a cylindrical surface of known radius, said radius being greater than the radius of said pipe, the axis of symmetry of said surface being parallel with said first axis and on the side of said pipe opposite said surface, fixing with and in contiguous parallel relation with said pipe, a gauge having first and second axially-spaced coaxial cylindrical sections of diameters equal, respectively, to the standard wall thickness of said pipe and the minimum acceptable wall thickness of said pipe, and exposing said plate with gamma rays emanating from a point on said axis of symmetry to include in the developed plate, contiguous images of the projections thereon of wall thickness of said pipe and said gauge sections, whereby the dimensions of said images may be visually compared to determine whether the actual wall thickness of said pipe is acceptable.

7. The method of claim 6, said gauge being positioned closely adjacent said pipe and with its axis parallel with said axis of symmetry and intersecting an arc centered on said point and having a dimension equal to the normal from said point to the axis of said pipe.

8. The method of claim 6, said gauge being positioned with its axis parallel with said axis of symmetry and with its section of greater radius in tangential line contact with said pipe and in the common plane of said axis of symmetry and said longitudinal axis.

9. That method of determining the wall thickness of a tubular body having a longitudinal axis comprising, fixing with and at one side of said body, the sensitized concave surface of a photographic plate formed as a portion of a cylindrical surface, and with its axis of symmetry parallel with said longitudinal axis, exposing said plate with gamma rays emanating from a point on the axis of symmetry of said cylindrical surface and on the side of said body opposite said plate, and measuring the projected dimension of wall thickness of said body on the developed plate as a function of true wall thickness of said body.

References Cited in the file of this patent

UNITED STATES PATENTS

| | | |
|---|---|---|
| 2,399,650 | Moyer | May 7, 1946 |
| 2,426,884 | Kieffer | Sept. 2, 1947 |
| 2,435,134 | Forssell | Jan. 27, 1948 |
| 2,525,292 | Fua et al. | Oct. 10, 1950 |
| 2,684,446 | Paatero | July 20, 1954 |
| 2,748,290 | Reichertz | May 29, 1956 |
| 2,812,440 | Hartman et al. | Nov. 5, 1957 |
| 2,957,987 | Arnesen | Oct. 25, 1960 |